US008190313B2

(12) United States Patent
Moffitt et al.

(10) Patent No.: US 8,190,313 B2
(45) Date of Patent: May 29, 2012

(54) SYSTEM AND METHOD FOR REDUCING A PENALTY PERIOD FOR A DISTRIBUTED POWER TRAIN

(75) Inventors: Robert Lyn Moffitt, Palm Bay, FL (US); Louis Cox, Satellite Beach, FL (US)

(73) Assignee: General Electric Company, Schenectady, NY (US)

( * ) Notice: Subject to any disclaimer, the term of this patent is extended or adjusted under 35 U.S.C. 154(b) by 526 days.

(21) Appl. No.: 12/249,503

(22) Filed: Oct. 10, 2008

(65) Prior Publication Data

US 2010/0094489 A1    Apr. 15, 2010

(51) Int. Cl.
*B60T 8/00* (2006.01)

(52) U.S. Cl. ............. 701/19; 701/20; 701/70; 303/19; 303/128

(58) Field of Classification Search ........... 701/19, 701/20, 70; 303/128, 3, 14, 15, 16, 20
See application file for complete search history.

(56) References Cited

U.S. PATENT DOCUMENTS

| 4,626,039 | A |   | 12/1986 | Worbois |   |
|---|---|---|---|---|---|
| 4,971,398 | A |   | 11/1990 | Ingalls |   |
| 5,020,862 | A |   | 6/1991 | Balukin et al. |   |
| 5,249,125 | A | * | 9/1993 | Root et al. | 701/70 |
| 5,507,457 | A |   | 4/1996 | Kull |   |
| 5,549,363 | A |   | 8/1996 | Kanjo et al. |   |
| 5,720,455 | A | * | 2/1998 | Kull et al. | 246/187 C |
| 5,866,811 | A |   | 2/1999 | Skantar |   |
| 6,042,201 | A | * | 3/2000 | Marra et al. | 303/128 |
| 6,126,247 | A |   | 10/2000 | Paul et al. |   |
| 6,275,165 | B1 |   | 8/2001 | Bezos |   |
| 6,371,575 | B1 | * | 4/2002 | Lewis et al. | 303/128 |
| 6,401,015 | B1 |   | 6/2002 | Stewart et al. |   |
| 6,435,623 | B1 |   | 8/2002 | Peltz |   |
| 6,671,591 | B2 |   | 12/2003 | Wolf et al. |   |
| 6,759,951 | B2 |   | 7/2004 | Kellner et al. |   |

(Continued)

FOREIGN PATENT DOCUMENTS

EP    0 976 633    2/2000

(Continued)

OTHER PUBLICATIONS

The WO Search Report Issued in connection with corresponding International Application No. PCT/US2009/057643 on Feb. 3, 2011.

(Continued)

*Primary Examiner* — Mark Le
(74) *Attorney, Agent, or Firm* — GE Global Patent Operation; John A. Kramer

(57) ABSTRACT

A system is provided for reducing a penalty period for a distributed power train. The distributed power train includes a braking system that switches into an application state upon commencement of the penalty period. The braking system includes a fluid carrying brake pipe which connects a first locomotive and a remote locomotive. The system includes a sensor positioned within the distributed power train, which measures a parameter related to the operation of the braking system. A control processor is positioned within the first locomotive, and is coupled to the sensor. Subsequent to the commencement of the penalty period, the control processor monitors the measured parameter and switches the braking system from the application state into a release state to reduce the penalty period, based on the measured parameter falling within a predetermined safety range. Additionally, a method is provided for reducing a penalty period for a distributed power train.

21 Claims, 10 Drawing Sheets

U.S. PATENT DOCUMENTS

| | | |
|---|---|---|
| 6,862,502 B2 | 3/2005 | Peltz et al. |
| 2003/0107262 A1 | 6/2003 | Smith et al. |
| 2005/0189815 A1 | 9/2005 | Bryant |
| 2007/0236078 A1* | 10/2007 | Smith et al. ................ 303/7 |

FOREIGN PATENT DOCUMENTS

| | | |
|---|---|---|
| WO | WO 02/053439 | 7/2002 |

OTHER PUBLICATIONS

The WO Written Opinion Report Issued in connection with corresponding International Application No. PCT/US2009/057643 on Feb. 3, 2011.

* cited by examiner

SYSTEM AND METHOD FOR REDUCING A PENALTY PERIOD FOR A DISTRIBUTED POWER TRAIN

BACKGROUND OF THE INVENTION

Distributed power train operation involves the controlled coordination of motive power supplied from a lead locomotive and one or more remote locomotives spaced apart from the lead locomotive in a train consist. The lead and remote locomotives are linked together and controlled in concert to pull or otherwise move one or more non-powered load vehicles. Each lead and remote locomotive includes a braking processor for controlling the operations of a respective braking system and a communication system for exchanging information between the lead and remote locomotives over a communication link. A brake pipe fluidically interconnects each of the locomotives and rail cars of the train wherein modulation of a fluid flow, such as a fluid pressure in the brake pipe, is conventionally used to indicate desired braking operations. Remote locomotive braking operations may be controlled responsive to sensed brake pipe flow conditions at the respective remote locomotives.

During the operation of a distributed power train, various circumstances may arise which trigger a "penalty brake" operation or application. Here, upon the occurrence of a designated stimulus, or based on certain operating conditions of the train (e.g., the train going over a designated speed limit, a determination that the train is in imminent threat of hitting another vehicle or other object, or the train passing a "stop" signal), a command is initiated for automatically causing the train's brake system in engage. That is, based upon the occurrence of certain conditions, operation of the train is "penalized" by automatically causing it to slow down and stop. The penalty brake application lasts a minimum time period (commonly referred to as the "penalty period"), such as 120 seconds, during which the fluid pressure within the brake pipe is minimized, causing a full application of the braking system to stop the train for the minimum time period. The minimum time period is arbitrarily set to ensure that the distributed power train has completely stopped prior to the end of the penalty period. The penalty period is mandatory and may be enforced by an outside agency, such as the Federal Railroad Administration (FRA), for example. Thus, upon the occurrence of a circumstance giving rise to a penalty brake application, the distributed power train is automatically stopped for the penalty period, irrespective of whether adequate safety conditions are present to indicate that the train has completely stopped prior to the end of the penalty period.

Heretofore, the time length of a penalty period is mandatory and introduces noticeable delays and inefficient operation of a distributed power train, particularly when multiple penalty periods are triggered in succession. Thus, it would be advantageous to provide a system which improves the efficient operation of the distributed power train by reducing the duration of a penalty period by verifying that adequate safety conditions are present to indicate that the train has completely stopped.

BRIEF DESCRIPTION OF THE INVENTION

One embodiment of the present invention provides a system for reducing a penalty period for a distributed power train. The distributed power train includes a braking system that switches into an application state upon the commencement of the penalty period. The distributed power train includes a first locomotive and a remote locomotive. The braking system includes a fluid carrying brake pipe that connects the first locomotive and the remote locomotive. The system includes a sensor positioned within the distributed power train, which measures a parameter related to the operation of the braking system. A control processor is positioned within the first locomotive, and is coupled to the sensor. Subsequent to the commencement of the penalty period, the control processor monitors the measured parameter and switches the braking system from the application state into a release state to reduce the penalty period, based on the measured parameter being within a predetermined safety range. (Here, the first locomotive may be a lead locomotive, but is not limited in this regard. Thus, "first" is an arbitrary designation for distinguishing the first locomotive from the remote locomotive or other vehicles, it being recognized that the functionality of the present invention need not necessarily be embodied solely in a lead locomotive. "Remote" is also an arbitrary designation that refers to another locomotive other than the first locomotive. Thus, the remote locomotive may be contiguous with the first locomotive or separated there from by one or more other locomotives and/or non-locomotive rail cars.)

Another embodiment of the present invention provides a system for reducing a penalty period for a distributed power train. The system includes the distributed power train having a first locomotive and a remote locomotive. Additionally, the system includes a braking system, which switches into an application state upon the commencement of the penalty period. The braking system includes a fluid carrying brake pipe that connects the first locomotive and the remote locomotive. The system further includes a sensor positioned within the distributed power train, to measure a parameter related to the operation of the braking system. Subsequent to the commencement of the penalty period, the braking system switches from the application state into a release state to reduce the penalty period, based on the measured parameter being within a predetermined safety range.

Another embodiment of the present invention provides a method for reducing a penalty period for a distributed power train. The distributed power train includes a braking system, which switches into an application state upon commencement of the penalty period. The distributed power train includes a first locomotive and a remote locomotive. The braking system includes a fluid carrying brake pipe that connects the first locomotive and the remote locomotive. The method includes measuring a parameter related to the operation of the braking system, and monitoring the measured parameter subsequent to the commencement of the penalty period. Additionally, the method includes determining whether the measured parameter falls within a predetermined safety range. The method further includes switching the braking system from the application state into a release state to reduce the penalty period, based on the measured parameter falling within the predetermined safety range.

DETAILED DESCRIPTION OF THE INVENTION

The present inventors have observed that, during distributed power train operations, noticeable delays and inefficiencies are introduced during certain penalty brake applications, when the braking system is switched into the full application state for the minimum time period (penalty period), in an effort to ensure that the train has stopped. The inventors have recognized that various parameters related to the operation of the braking system may be monitored, to indicate whether or not the distributed power train has stopped, and thus reduce the penalty period by switching the braking system to the release state prior to the end of the penalty period. The pressure within the brake pipe of the distributed power train is an example of such a monitored parameter. A discussion of the measurement and monitoring of the brake pipe pressure within a distributed power train is discussed in U.S. Patent Publication No. 2007/0236078, filed on Apr. 10, 2006, and assigned to the assignee of the present application, which is incorporated by reference herein in its entirety.

Figure 1:
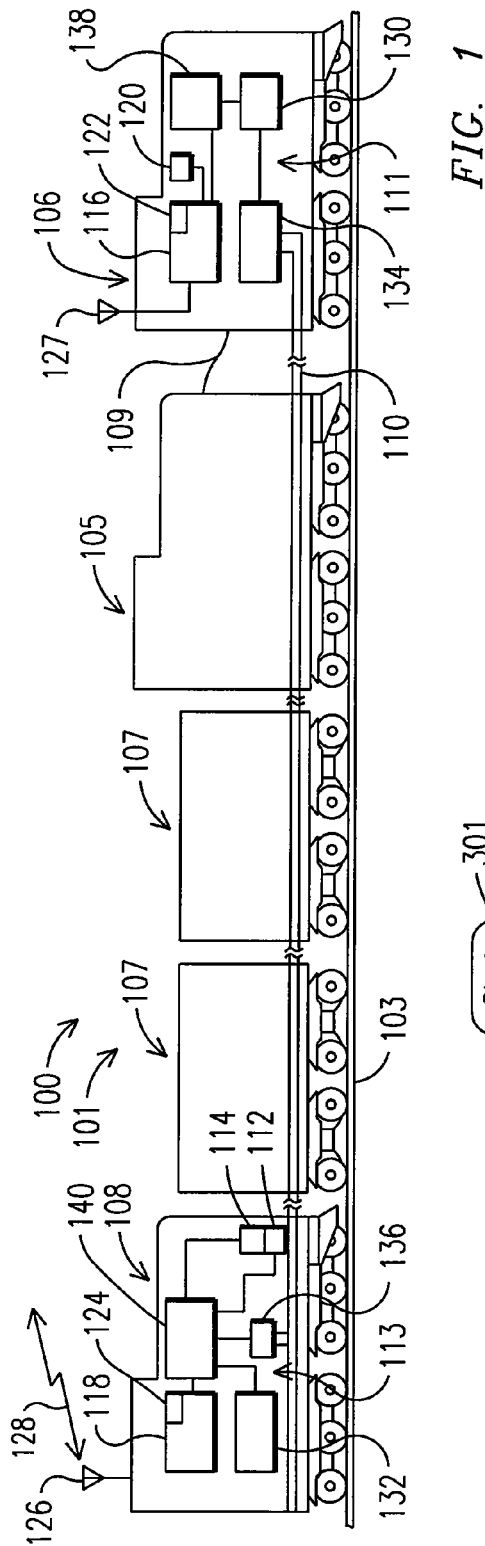
FIG. 1 is a schematic diagram of a distributed power train utilized in an exemplary embodiment of a system for reducing a penalty period of the distributed power train.

FIG. 1 illustrates an exemplary embodiment of a system 100 for reducing a penalty period for a distributed power train 101 traveling along a route 103, such as a railroad, for example. The distributed power train 101 includes a pair of lead or other first locomotives 105,106, a remote locomotive 108, and train cars 107 positioned between the lead locomotives 105,106 and the remote locomotive 108. The lead locomotives 105,106 may be communicatively coupled with trainline cables 109, for example. The lead locomotive 106 includes a lead braking system 111 and the remote locomotive 108 includes a remote braking system 113. The braking system 111,113 includes a fluid carrying brake pipe 110, which extends the length of the distributed power train 101, and connects the lead locomotive 106 and the remote locomotive 108. Although FIG. 1 illustrates a distributed power train having two lead locomotives and a single remote locomotive, this embodiment is merely exemplary, and the embodiments of the present invention may be applicable to a distributed power train having a varied arrangement of lead locomotives and/or remote locomotives. Also, as indicated above, embodiments of the present invention are applicable to any distributed power train having two or more locomotives, arbitrarily designated herein as a first locomotive and a remote locomotive. The first locomotive is shown and described herein as being the lead locomotive in the train, but this is for illustration purposes only and is not meant to be limiting, unless otherwise specified.

As discussed above in regards to certain embodiments of the present invention, the braking systems 111,113 are switched to the application state upon a reduction in a pressure in the brake pipe 110 below an application pressure, such as 64 PSIG (pounds per square inch gauge), for example. The braking systems 111,113 are switched to the release state upon an increase in the pressure in the brake pipe 110 above a release pressure, such as 90 PSIG, for example. For example, the braking systems 111,113 may be switched from the release state to the application state by reducing the release pressure of 90 PSIG by 26 PSIG to below the application pressure of 64 PSIG. The numeric pressure thresholds discussed above in this example are merely exemplary, and the exact numeric pressure thresholds of application or release of the braking systems 111,113 may vary, based on the characteristics of the distributed power train 101, for example.

During any of a number of penalty circumstances, the distributed power train 101 initiates a penalty brake application or operation, which lasts a minimum time period (the penalty period), such as 120 seconds, for example, in which the braking systems 111,113 are switched to the application state by lowering the pressure within the brake pipe 110 below the application pressure, such as below 64 PSIG, for example. For example, when the lead locomotive 106 and the remote locomotive 108 are linked through a wireless link 128 communicated through a respective transceiver 126,127 of the remote locomotive 108 and the lead locomotive 106, a penalty brake application may be automatically triggered and the brake pipe 110 pressure is lowered below the application pressure for the minimum time period. Other examples of a penalty circumstance which may trigger a penalty period include a failure in a component or a system within the distributed power train 101 and/or a speed of the distributed power train 101 exceeding a maximum speed threshold, as measured by a wayside device (not shown) adjacent to the route 103, for example. Numerous other examples of penalty circumstances exist, all of which involve a mandatory reduction in the brake pipe 110 pressure below the application pressure for the minimum time period.

As further illustrated in the exemplary embodiment of FIG. 1, the system 100 includes sensors 112,114 positioned within the distributed power train 101, to measure a parameter related to the operation of the respective braking system 111, 113. For example, a fluid pressure sensor 112 is coupled to the brake pipe 110 adjacent to the remote locomotive 108, to measure a pressure within the brake pipe 110 adjacent to the remote locomotive 108. Additionally, a speed sensor 114 is positioned on the distributed power train 101, such as on the remote locomotive 108, to measure a speed of the distributed power train 101. An example of such a speed sensor may be an axle counter, which counts the number of rotations of the wheels of a locomotive, and, based on a known circumference of the wheels, can calculate the speed of the locomotive. In addition to being used for communicating with one another over the wireless link 128, the transceivers 126,127 may be global positioning system (GPS) transceivers which are in communication with GPS satellites (not shown), to determine a location of the respective remote locomotive 108 and the lead locomotive 106. The speed sensor may be a GPS speed sensor that is coupled to the GPS transceiver 126, and determines the speed of the distributed power train 101, based on the position information provided by the GPS transceiver 126 and time data provided by a clock, for example. The sensors 112,114 are coupled to a remote processor 118, positioned on the remote locomotive 108. Although FIG. 1 illustrates one pressure sensor and one speed sensor, each of which are positioned on the remote locomotive, the embodiments of the present invention are applicable for more than one pressure sensor and/or speed sensor, which may be positioned at a location other than the remote locomotive, for example.

As further illustrated in the exemplary embodiment of FIG. 1, the system 100 includes a lead processor 116 positioned within the lead locomotive 106. ("Lead" processor refers to a processor in a lead locomotive, but this is merely an example. As mentioned above, embodiments are applicable, more generally, to a control processor in a first locomotive, that is, a processor configured to carry out one or more control functions of the first locomotive or train 101. The processor may be specific to the braking system, specific to the penalty period reduction system, or it may be a processor used in the locomotive/train for multiple purposes.) The lead processor 116 is coupled to the pressure sensor 112 and/or the speed sensor 114 (via the wireless link 128 to the remote processor 118), and receives the measured pressure and/or speed data from the pressure sensor 112 and/or the speed sensor 114. Subsequent to a penalty circumstance, such as the linking between the lead locomotive 106 and the remote locomotive 108, as discussed above, and the commencement of the penalty period, the lead processor 116 is configured to monitor the measured pressure of the brake pipe 110 and/or measured speed of the distributed power train 101. Based on the measured pressure in the brake pipe 110 and/or the measured speed of the distributed power train 101, the lead processor 116 is configured to switch the braking system 111,113 from the application state into a release state, and reduce the minimum time period during which the application pressure in the brake pipe 110 is imposed. Thus, the distributed power train 101 need not remain stationary with the braking systems 111,113 in the application state for the entire minimum time period, thereby reducing delays and improving the efficient operation of the distributed power train 101.

As illustrated in the exemplary embodiment of FIG. 1, the lead locomotive 106 includes a display 120 coupled to the lead processor 116. The display 120 is configured to output the measured pressure within the brake pipe 110 and the measured speed of the distributed power train 101. The lead processor 116 includes a memory 122 to store a respective predetermined safety range of the measured pressure within the brake pipe 110, and a respective predetermined safety range of the measured speed of the distributed power train 101. The lead processor 116 monitors the measured pressure within the brake pipe 110 adjacent to the remote locomotive 108 and the measured speed of the distributed power train 101, and determines whether the measured pressure and/or the measured speed are within the respective predetermined safety range of the measured pressure and the measured speed, provided by the memory 122. Subsequent to determining that the measured pressure and/or the measured speed are within the respective predetermined safety range, the lead processor 116 may transmit an output to the display 120 to prompt an operator of the lead locomotive 106 to switch the braking system 111 from the application state to the release state, as discussed in greater detail below. In an exemplary embodiment, the predetermined safety range of the measured pressure may be a pressure below the application pressure, such as a pressure below 64 PSIG, for example. In another exemplary embodiment, the predetermined safety range of the measured speed may be a speed below a low speed threshold that approaches or equals zero, as indicative that the distributed power train 101 has actually stopped, for example.

As further illustrated in FIG. 1, the remote processor 118 is communicatively coupled to the lead processor 116 over the wireless link 128. (The remote locomotive 108 may include a memory unit 124 associated with the processor 118.) The respective braking system 111,113 of the lead locomotive 106 and the remote locomotive 108 include a respective brake handle 130,132, a respective brake valve 134,136, and a respective brake processor 138,140 coupled to the respective brake handle 130,132 and the respective brake valve 134,136. Subsequent to the commencement of the penalty phase, the respective brake processor 138,140 moves the respective brake handle 130,132 to a suppression position and switches the respective brake valve 134,136 to a closed position. As discussed above, subsequent to the commencement of the penalty phase, the pressure within the brake pipe 110 is reduced below an application value, such as below 64 PSIG, and the respective brake processor 138,140 moves the respective brake handle 130,132 to the suppression position and switches the respective brake valve 134,136 to the closed position, in response thereto.

Subsequent to determining that the measured pressure and/or the measured speed falls within the respective predetermined safety range, the lead processor 116 may transmit one or more of: a lead valve signal to the brake processor 138 of the lead locomotive 106 to move the brake valve 134 from the closed position to an open position; a signal to the display 120 to prompt the operator of the distributed power train 101 to switch the brake handle 130 from the suppression position to the release position; and/or a first release signal to the brake processor 138 of the lead locomotive 106 such that the braking system 111 of the lead locomotive 106 switches from the application state to the release state to initiate an increase in the pressure within the brake pipe 110. Subsequent to the first release signal, the lead processor 116 is further configured to transmit a second release signal to the remote processor 118 (over the wireless link 128) to switch the remote braking system 113 from the application state to the release state. As illustrated in FIG. 1, subsequent to receiving the second release signal from the lead processor 116, the remote processor 118 determines whether the measured pressure within the brake pipe 110 adjacent to the remote locomotive 108 has increased from the application value, such as 64 PSIG, for example. If the pressure within the brake pipe 110 has increased from the application value, the remote processor 118 transmits one or more of: a remote valve signal to the brake processor 140 of the remote locomotive 108 to move the brake valve 136 from the closed position to an open position; and/or a remote handle signal to the brake processor 140 of the remote locomotive 108 to switch the brake handle 132 from the suppression position to a release position. Subsequent to the brake processor 140 moving the brake valve 136 to the open position and switching the brake handle 132 to the release position, the braking system 113 of the remote locomotive 108 is switched from the application state to the release state, to permit an increase in the pressure in the brake pipe 110.

Figure 2:
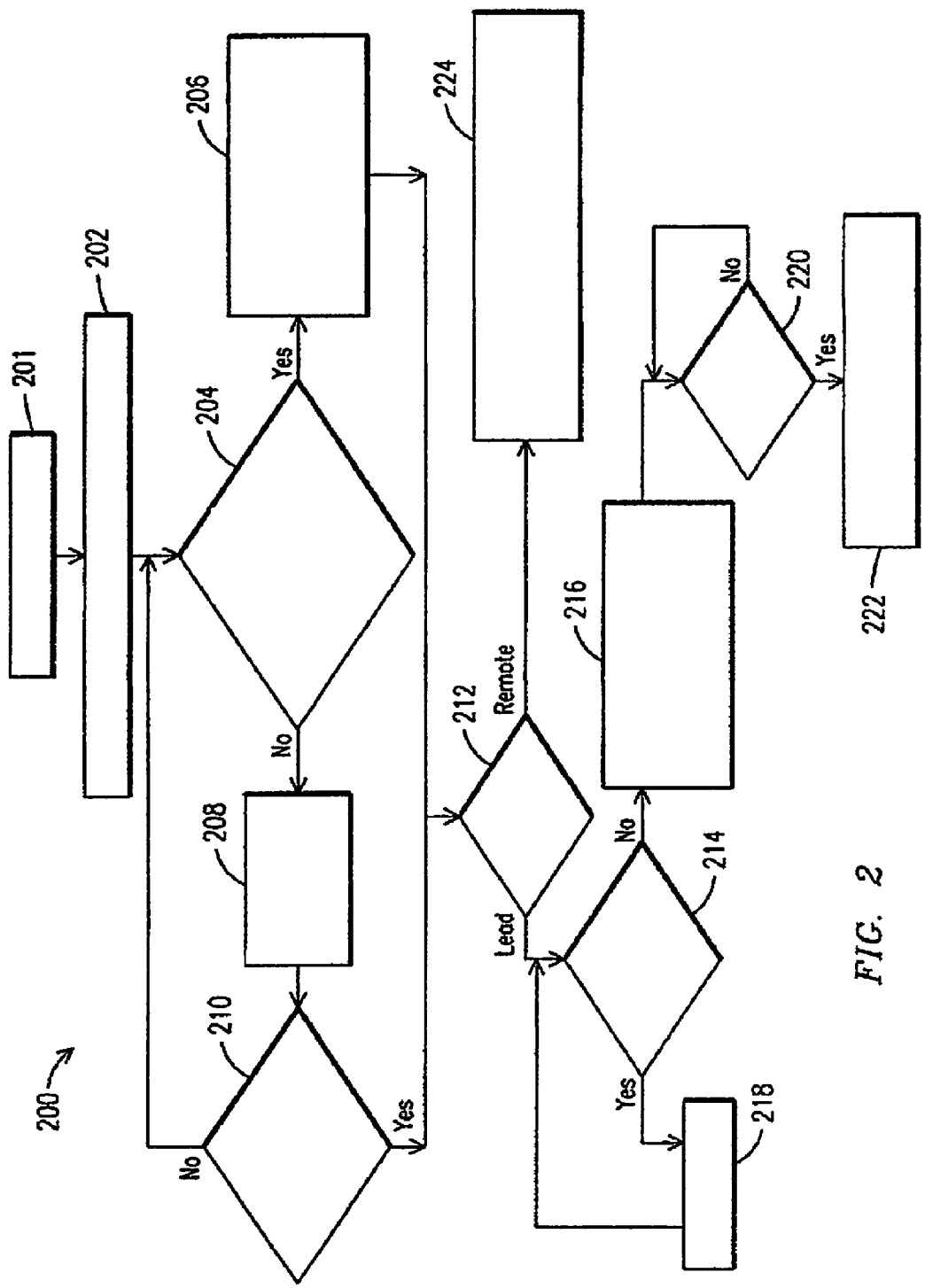
FIG. 2 is a flow chart of an exemplary embodiment of a method for reducing a penalty period of the distributed power train.
Figure 4:
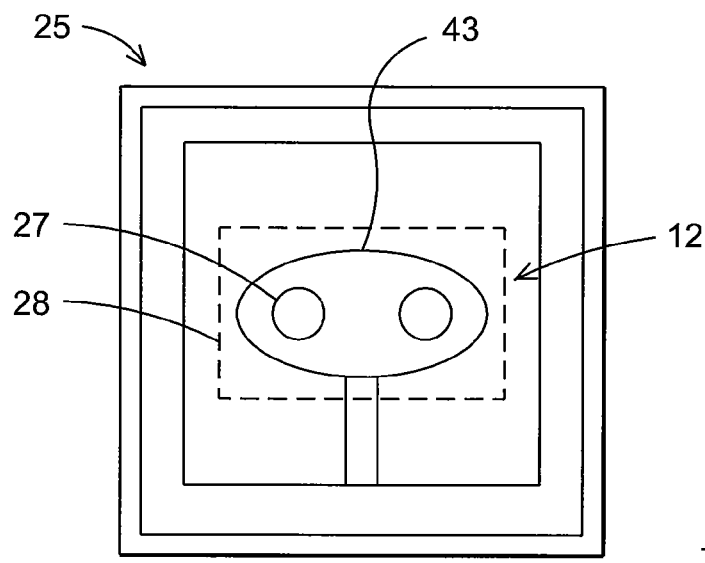
Figure 5:
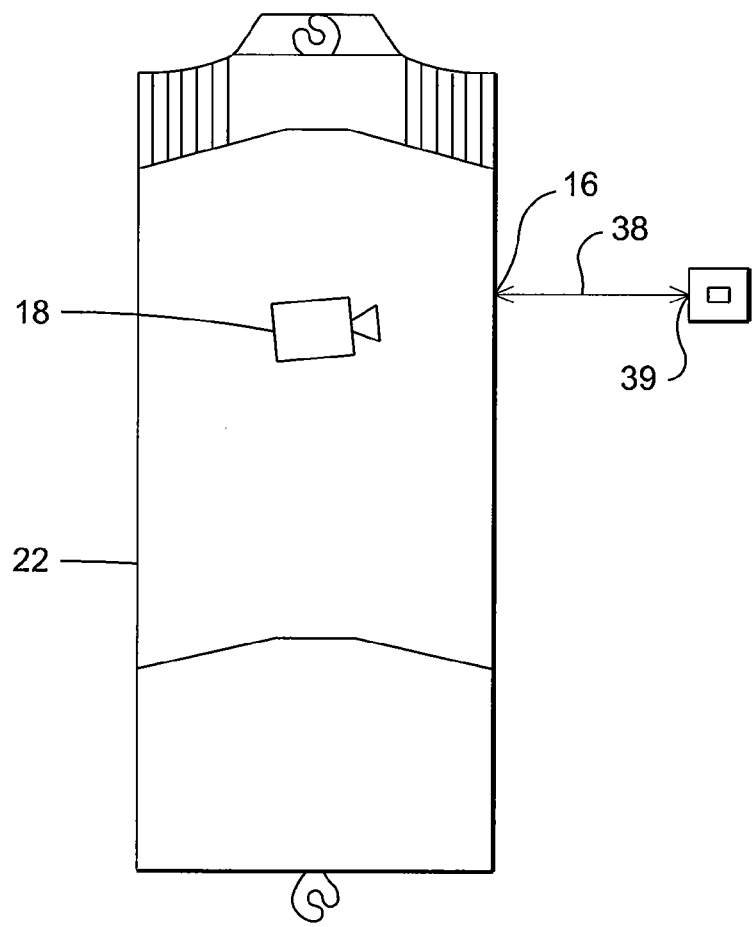
Figure 6:
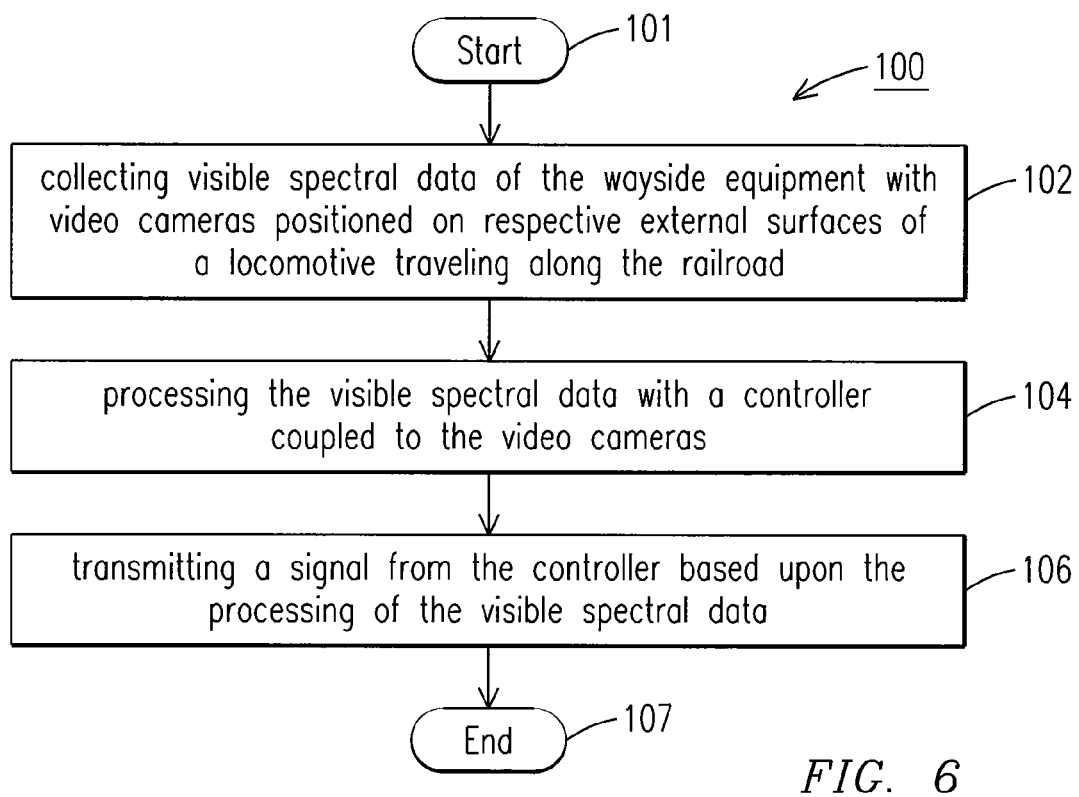
Figure 10:
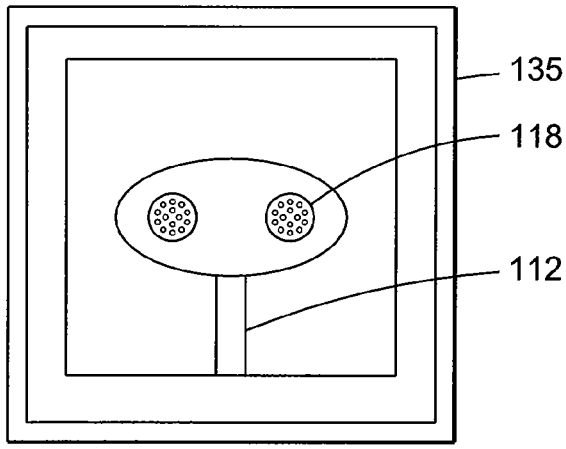
Figure 11:
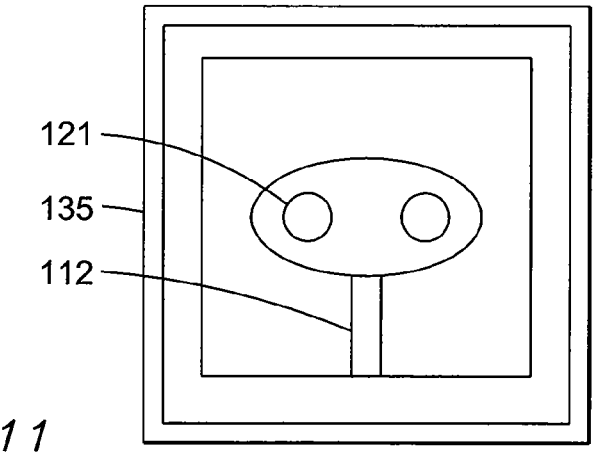
Figure 7:
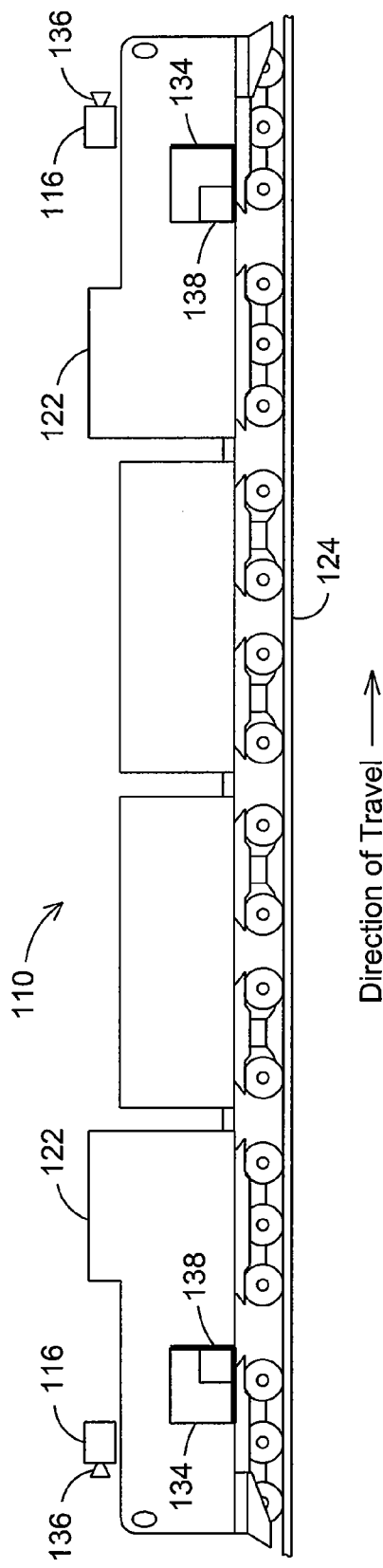
Figure 8:
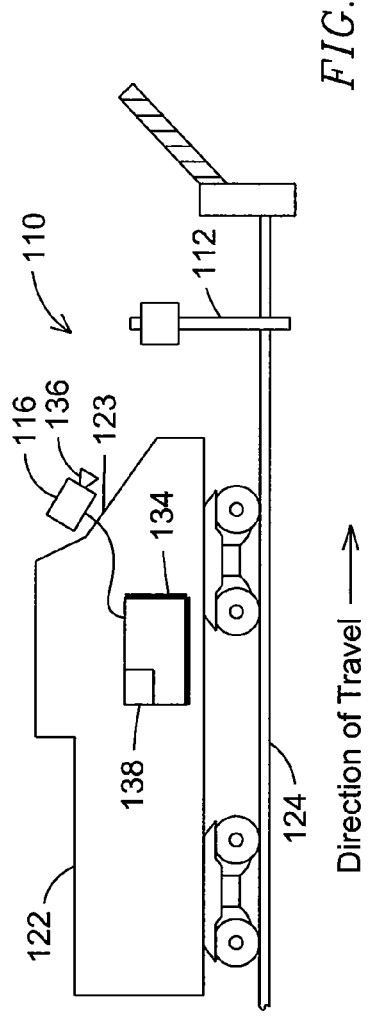
Figure 9:
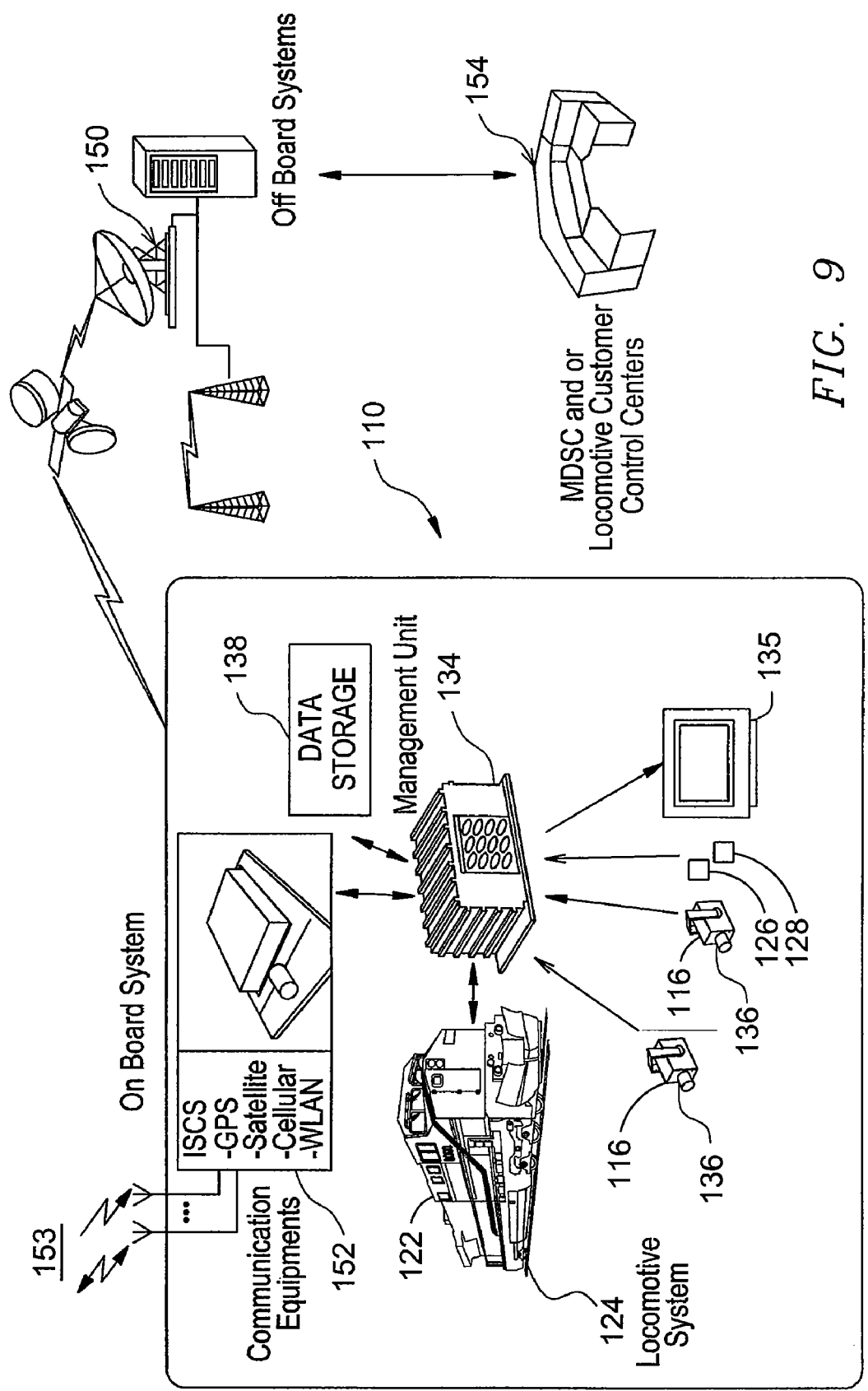
Figure 12:
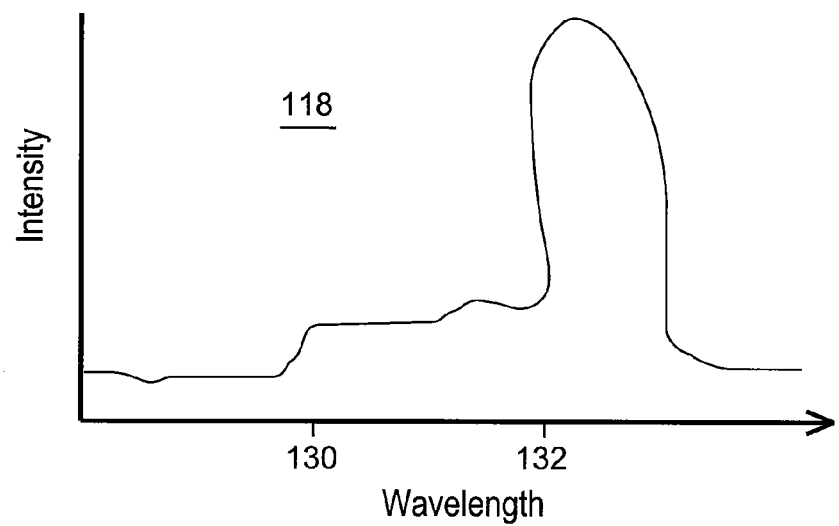
Figure 13:
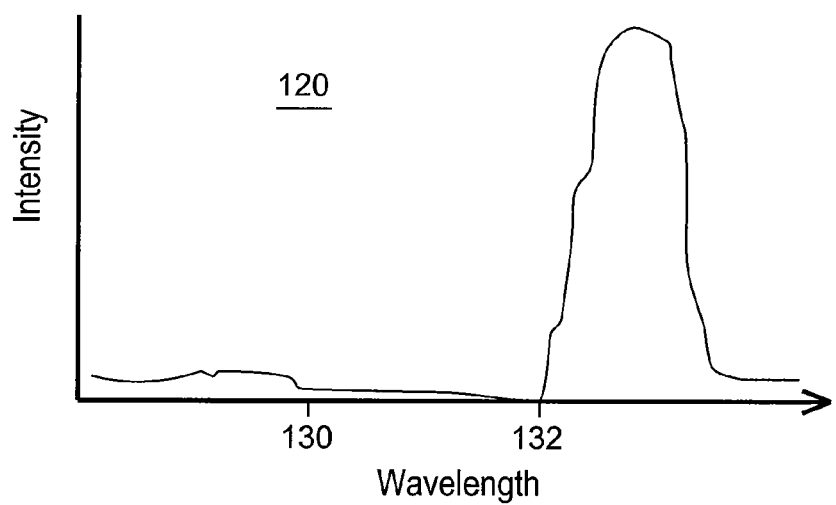
Figure 14:
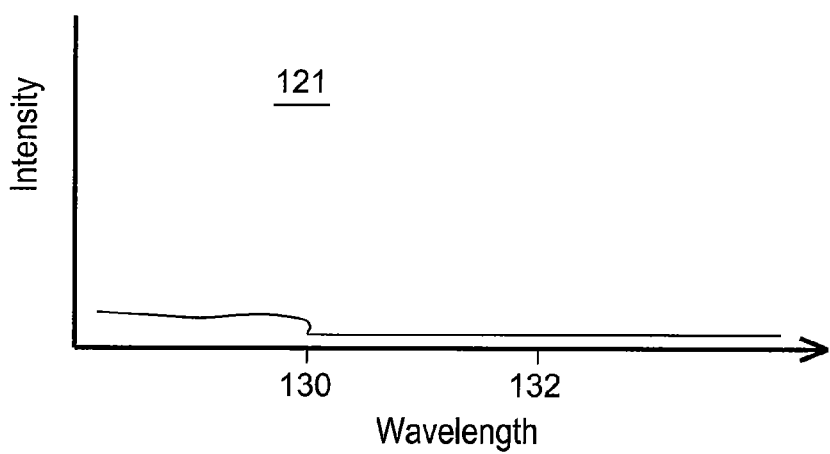
Figure 15:
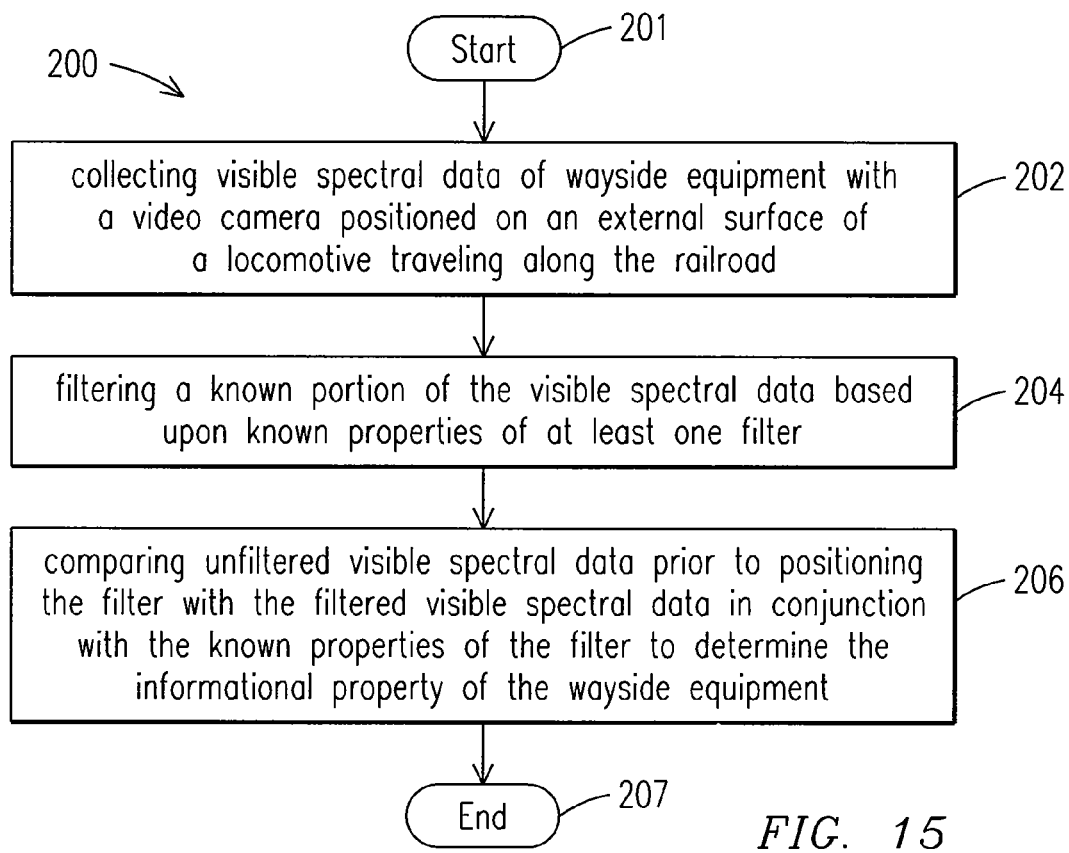
Figure 21:
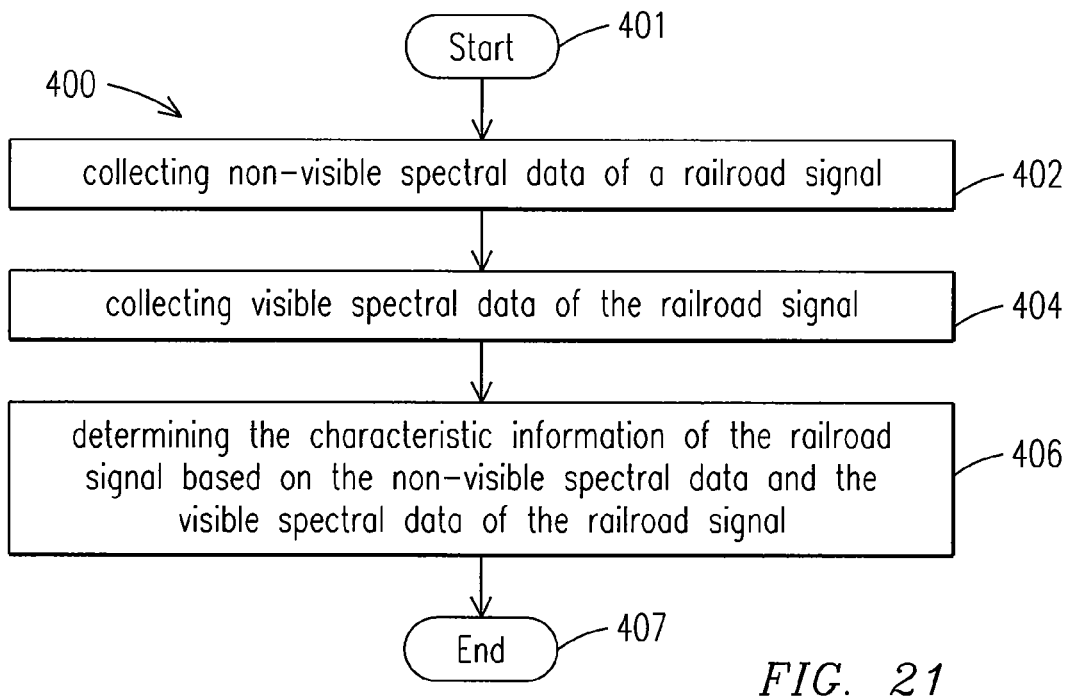
Figure 16:
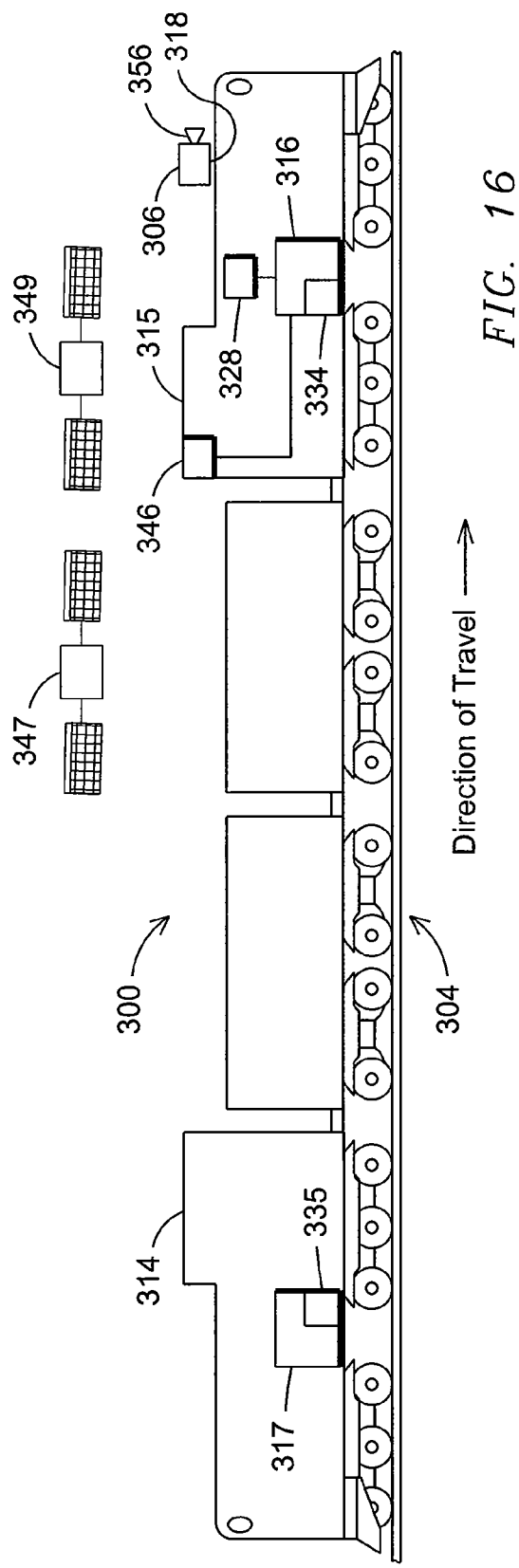
Figure 17:
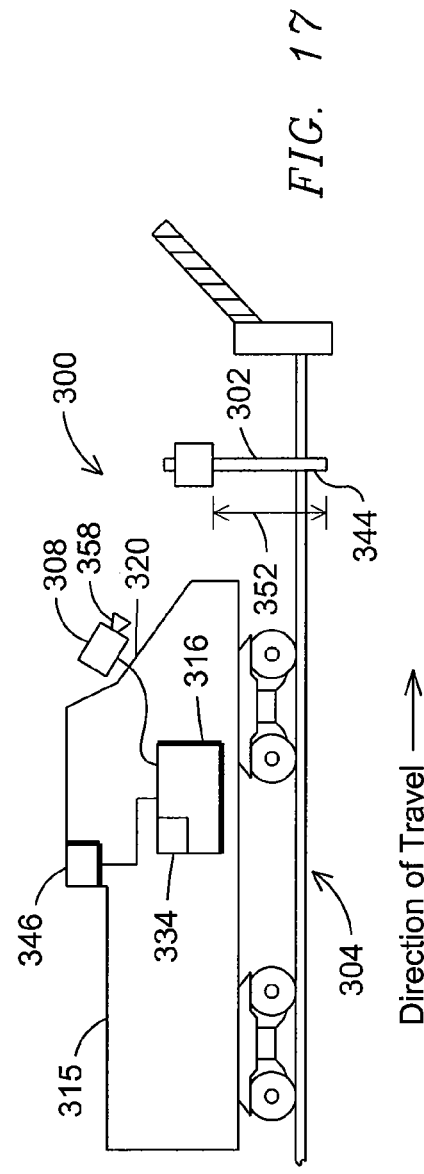
Figure 18:
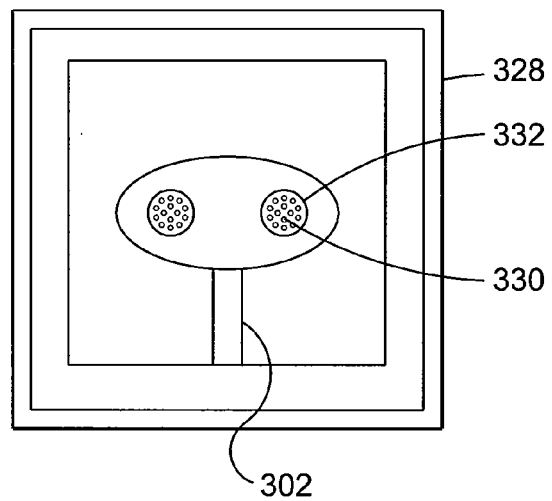
Figure 19:
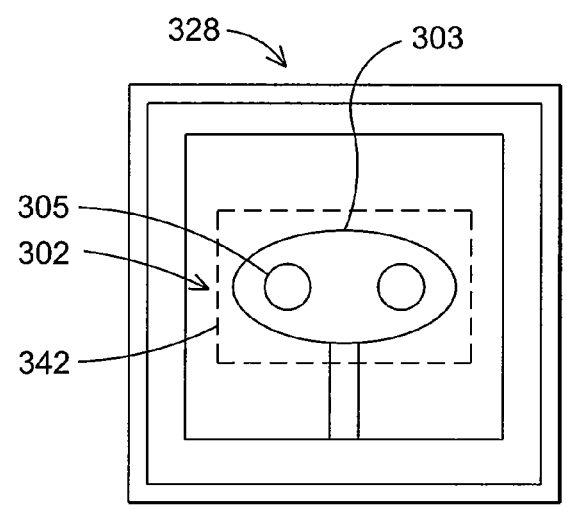
Figure 20:
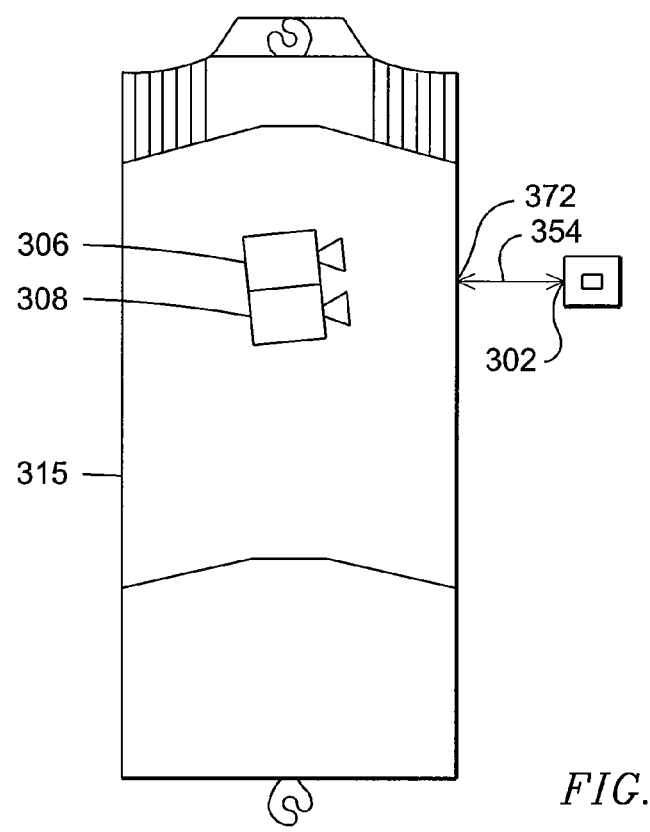

FIG. 2 illustrates an exemplary embodiment of a method 200 for reducing a penalty period of the distributed power train 101. The steps of the method 200 involve similar steps to those discussed in the embodiments of FIG. 1 above. As previously stated, upon the occurrence of a penalty circumstance, the braking systems 111,113 of the distributed power train 101 are switched to the application state, at 201. Additionally, as discussed above, the brake handle 130,132 or brake valve handle (BVH) is switched to the suppression position, at 202. The lead processor 116 then monitors the measured pressure within the brake pipe 110, to determine if it is less than 64 PSIG, and also monitors the measured speed of the distributed power train 101, to determine if is at zero or approaching zero, at 204. Additionally, the lead processor 116 determines whether the lead brake handle 130 is still in the suppression position, at 204. If all of these criteria are true, the method 200 involves a 5 second pause by the lead processor 116 and a verification that the remote brake handle 132 is in the suppression position, at 206. If all of the criteria are not true, the method 200 initiates a 2-minute timer, at 208, during which the pressure and speed are constantly compared with the above thresholds, and the lead brake handle 130 is checked as to whether it is in the suppression position. If, after the 2-minute period, the pressure and speed don't comply with the above thresholds (see 210), the method 200 continues to distinct steps for the lead locomotive 106 and the remote locomotive 108, at 212. The lead locomotive 106 transmits a signal to the brake processor 138, and awaits a response, to determine whether any functional failure exists in the braking system 111 (or EAB: electronic air brake), at 214. If a functional failure in the braking system 111 exists, such as through a lack of a response from the brake processor 138 to the signal transmitted from the lead locomotive 106, the distributed power train 101 remains in the penalty phase, at 218. If no failures in the braking system 111 are detected, the lead processor 116 (or lead DPC: lead distributive power computer) moves the brake valve 134 from the closed position to the open position (or clears a penalty bit), and transmits an output to the display 120 to prompt an operator of the lead locomotive 106 to switch the brake handle 130 from the suppression position to the release position, at 216, after which the lead processor 116 checks that the brake handle 130 has been moved from the suppression position to the release position, at 220. If the brake handle 130 is not in the release position, the method 200 continues to check the brake handle 130 until it is in the release position. The lead processor 116 then sends the first release signal (discussed above) to the brake processor 138 to release the braking system 111, and sends the second release signal to the remote processor 118, at 222. Upon receiving the second release signal, the remote processor 118 (or remote DPC: remote distributive power computer) moves the brake valve 136 from the closed position to the open position, switches the brake handle 132 to the release position, and releases the braking system 113, at 224.

Figure 3:
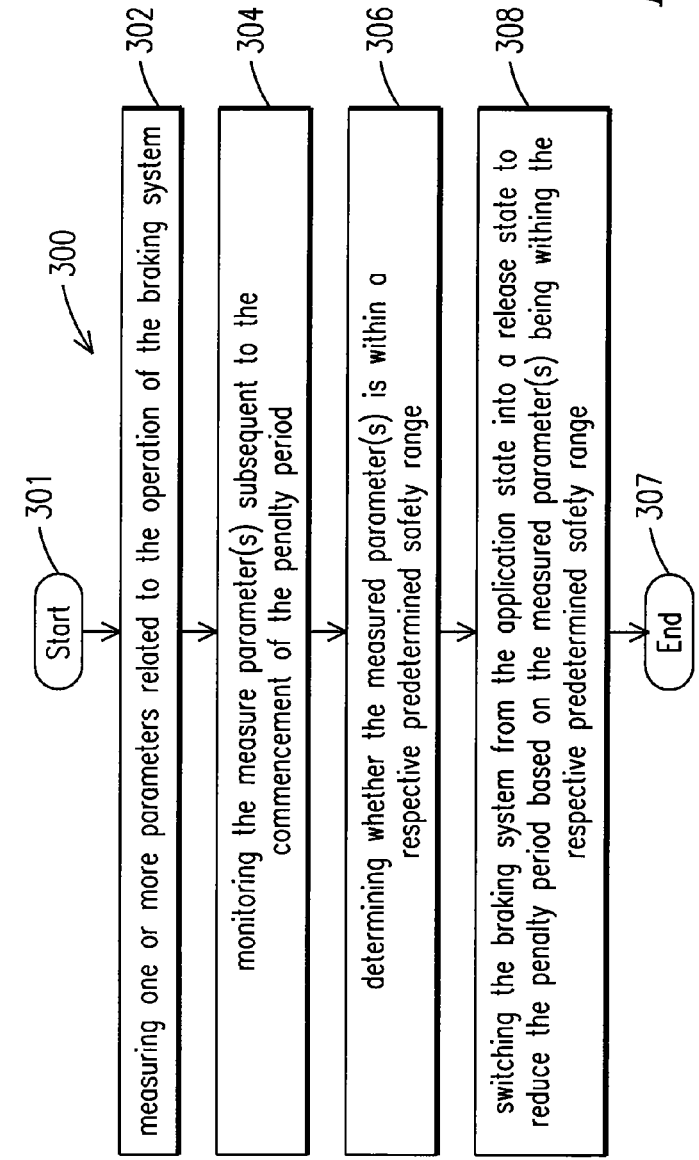
FIG. 3 is a flow chart of an exemplary embodiment of a method for reducing a penalty period of the distributed power train.

FIG. 3 illustrates a flowchart depicting an exemplary embodiment of a method 300 for reducing a penalty period for the distributed power train 101. The method 300 includes measuring 302 one or more parameters related to the operation of the braking system 111, 113. (This may include parameters related directly to braking system operation, e.g., brake fluid pressure, and parameters relating to the effects of the braking system on the train or locomotive(s), such as train speed or acceleration levels, dynamic braking power output, or the like.) The method 300 further includes monitoring 304 the measured parameter(s) subsequent to the commencement of the penalty period. The method 300 further includes determining 306 whether the measured parameter(s) is within a respective predetermined safety range. The method 300 further includes switching 308 the braking system 111, 113 from the application state into a release state to reduce the penalty period based on the measured parameter(s) being within the respective predetermined safety range, before ending at 309.

Certain embodiments may be applicable to distributed power vehicle systems generally, meaning two or more powered vehicles that are linked together and controlled in concert to pull or otherwise move one or more non-powered load vehicles.

While various embodiments of the present invention have been shown and described herein, it will be obvious that such embodiments are provided by way of example only. Numerous variations, changes and substitutions may be made without departing from the invention herein. For example, the method and system described herein may be applied to any transportation system comprising members interconnected by a fluidic brake pipe such as a train, a semi-truck with trailers, etc. Accordingly, it is intended that the invention be limited only by the spirit and scope of the appended claims.

What is claimed is:

1. A method comprising:
    measuring an operational parameter indicative of movement of a vehicle system that comprises one or more powered vehicles and a braking system that is configured to switch into an application state when a penalty period having a predetermined time duration commences;
    monitoring the operational parameter to determine if the operational parameter falls within a predetermined safety range following commencement of the penalty period; and
    reducing the predetermined time duration of the penalty period by switching the braking system from the application state into a release state when the operational parameter falls within the predetermined range, wherein reducing the predetermined time duration occurs during application of the penalty period.

2. The method of claim 1, wherein measuring the operational parameter includes measuring a pressure of the braking system.

3. The method of claim 1, further comprising prompting an operator of the vehicle system to switch the braking system from the application state to the release state.

4. The method of claim 1, further comprising moving a brake handle of the braking system to a suppression position and switching a brake valve of the braking system to a closed position subsequent to commencement of the penalty period.

5. The method of claim 1, wherein measuring the operational parameter includes measuring at least one of a fluid pressure of the braking system or a speed of the vehicle system, and further comprising transmitting at least one of a lead valve signal to move a brake valve of the braking system from a closed position to an open position, a lead handle signal to switch a brake handle of the braking system, or a first release signal to increase a fluid pressure of the braking system.

6. The method of claim 1, further comprising:
    transmitting a release signal to switch the braking system from an application state to a release state;
    determining whether a fluid pressure of the braking system has increased from a designated value after receiving the release signal;
    transmitting a remote valve signal to move a brake valve of the braking system from a closed position to an open position; and
    transmitting a remote handle signal to switch a brake handle of the braking system from a suppression position to a release position.

7. The method of claim 1, wherein measuring the operational parameter includes measuring a speed of movement of the vehicle system.

8. A method comprising:
    switching a braking system of a vehicle system having one or more powered vehicles into an application state upon commencement of a penalty period having a predetermined time duration to slow or stop movement of the vehicle system;
    measuring an operational parameter indicative of movement of the vehicle system following commencement of the penalty period;
    reducing the predetermined time duration of the penalty period by switching the braking system from the application state to a release state subsequent to commencement of the penalty period based on the operational parameter being within a predetermined range, wherein reducing the time duration occurs during application of the penalty period.

9. The method of claim 8, further comprising monitoring the operational parameter after commencement of the penalty period and switching the braking system from the application state to the release state based on the operational parameter being within the predetermined range.

10. The method of claim 8, further comprising moving a brake handle of the braking system to a suppression position and switching a brake valve of the braking system to a closed position after commencement of the penalty period.

11. The method of claim 8, wherein measuring the operational parameter includes measuring a speed of movement of the vehicle system.

12. The method of claim 8, wherein measuring the operational parameter includes measuring a fluid pressure in the braking system.

13. The method of claim 8, wherein measuring the operational parameter includes measuring at least one of a fluid pressure of the braking system or a speed of the vehicle system, and further comprising transmitting at least one of a lead valve signal to move a brake valve from a closed position to an open position, a lead handle signal to switch a brake handle from a suppression position to a release position, or a first release signal to switch the braking system from the application state to the release state to initiate an increase in the fluid pressure within the braking system subsequent to the operational parameter being within the predetermined range.

14. A method comprising:
measuring at least one parameter related to movement of a vehicle system having one or more powered vehicles and a braking system;
monitoring the at least one parameter subsequent to commencement of a penalty period involving application of the braking system to slow or stop movement of the vehicle system, the penalty period including a predetermined time period that the braking system is applied to slow or stop movement of the vehicle system;
determining whether if the at least one parameter is within a predetermined range following commencement of the penalty period; and
determining whether to release the braking system from the application state before expiration of the penalty period based on the at least one parameter, wherein determining whether to release the braking system occurs during application of the penalty period.

15. The method of claim 14, wherein measuring the at least one parameter includes measuring at least one of a pressure within the braking system or a speed of the vehicle system.

16. The method of claim 14, further comprising displaying a prompt to an operator of the vehicle system to switch the braking system to the release state after determining that the parameter is within the predetermined range.

17. The method of claim 14, wherein the braking system includes a vehicle braking system within each of a plurality of the powered vehicles in the vehicle system;
and wherein subsequent to the commencement of the penalty period, the method includes:
moving a brake handle of at least one of the vehicle braking systems to a suppression position, and
switching a brake valve of the at least one of the vehicle braking systems to a closed position.

18. A method comprising:
commencing a penalty period having a predetermined time duration that includes application of a braking system of a vehicle system having one or more powered vehicles;
monitoring an operational parameter that is indicative of movement of a vehicle system following commencement of the penalty period;
changing the predetermined time duration of the penalty period following application of a braking system of the vehicle system based on a change in the parameter after the penalty period begins, wherein changing the predetermined time duration occurs during application of the penalty period; and
preventing the braking system from being released during the penalty period or during a changed duration of the penalty period.

19. The method of claim 18, wherein monitoring the operational parameter includes monitoring a fluid pressure of the braking system, and changing the predetermined time duration includes terminating the penalty period to allow release of the braking system when the fluid pressure rises above a predetermined value.

20. The method of claim 18, wherein monitoring the operational parameter includes monitoring a speed of movement of the vehicle system, and changing the predetermined time duration includes terminating the penalty period to allow release of the braking system when the speed falls below a predetermined value.

21. The method of claim 18, wherein changing the predetermined time duration includes shortening the predetermined time duration based on the change in the operational parameter.

* * * * *